United States Patent
Yao et al.

(10) Patent No.: US 11,012,883 B2
(45) Date of Patent: May 18, 2021

(54) MEASUREMENT JOB SUSPENSION AND RESUMPTION IN NETWORK FUNCTION VIRTUALIZATION

(71) Applicant: Apple Inc., Cupertino, CA (US)

(72) Inventors: Yizhi Yao, Chandler, AZ (US); Joey Chou, Scottsdale, AZ (US)

(73) Assignee: APPLE INC., Cupertino, CA (US)

( * ) Notice: Subject to any disclaimer, the term of this patent is extended or adjusted under 35 U.S.C. 154(b) by 12 days.

(21) Appl. No.: 16/465,453

(22) PCT Filed: Dec. 19, 2017

(86) PCT No.: PCT/US2017/067398
§ 371 (c)(1),
(2) Date: May 30, 2019

(87) PCT Pub. No.: WO2018/128804
PCT Pub. Date: Jul. 12, 2018

(65) Prior Publication Data
US 2020/0008088 A1  Jan. 2, 2020

Related U.S. Application Data

(60) Provisional application No. 62/443,256, filed on Jan. 6, 2017.

(51) Int. Cl.
*H04L 12/26* (2006.01)
*H04W 24/10* (2009.01)
(Continued)

(52) U.S. Cl.
CPC ........... *H04W 24/10* (2013.01); *H04L 43/062* (2013.01); *H04L 43/08* (2013.01); *H04W 24/04* (2013.01); *H04W 24/08* (2013.01)

(58) Field of Classification Search
CPC ..... H04W 24/10; H04W 24/04; H04W 24/08; H04L 12/26; H04L 43/062; H04L 43/08
See application file for complete search history.

(56) References Cited

U.S. PATENT DOCUMENTS

2011/0113429 A1* 5/2011 Oda .................... G06F 11/0709
718/102
2016/0224409 A1* 8/2016 Liu ..................... G06F 11/0709
(Continued)

OTHER PUBLICATIONS

3GPP TR 23.799, "3rd Generation Partnership Project; Technical Specification Group Services and System Aspects; Study on Architecture for Next Generation System (Release 14)", V1.2.1, Nov. 2016, 526 pages.
(Continued)

*Primary Examiner* — Chi Ho A Lee
*Assistant Examiner* — Andrew Lee
(74) *Attorney, Agent, or Firm* — Stoel Rives LLP

(57) ABSTRACT

An element manager (EM) of a virtualized network for a wireless communication system processes a suspend measurement job request received from a network manager (NM). The request is to suspend a measurement job to provide network function (NF) performance measurements related to a virtualized resource (VR). In response to the suspend measurement job request, the EM stops reports reporting measurement result data for the measurement job and determines whether to instruct a virtualized network function manager (VNFM) to delete one or more performance management (PM) jobs used to support the measurement job. The EM then generates a suspend measurement job response to indicate to the NM a result of the request to suspend the measurement job.

19 Claims, 10 Drawing Sheets

(51) Int. Cl.
*H04W 24/04* (2009.01)
*H04W 24/08* (2009.01)

(56) References Cited

U.S. PATENT DOCUMENTS

| | | | | |
|---|---|---|---|---|
| 2016/0321112 | A1* | 11/2016 | Iwashina | G06F 9/45558 |
| 2016/0328258 | A1* | 11/2016 | Iwashina | G06F 9/5072 |
| 2016/0330067 | A1* | 11/2016 | Liu | H04L 41/046 |
| 2016/0381150 | A1* | 12/2016 | Rajagopal | H04L 41/28 709/223 |
| 2017/0250870 | A1* | 8/2017 | Zhao | H04L 63/20 |
| 2018/0070119 | A1* | 3/2018 | Phillips | H04N 21/64322 |
| 2018/0077032 | A1* | 3/2018 | Park | H04L 43/50 |
| 2019/0052528 | A1* | 2/2019 | Yoshimura | H04L 41/0896 |
| 2019/0073235 | A1* | 3/2019 | Hoshino | H04L 41/0893 |

OTHER PUBLICATIONS

3GPP TS 28.520, "3rd Generation Partnership Project; Technical Specification Group Services and System Aspects; Telecommunication management; Performance Management (PM) for mobile networks that include virtualized network functions; Requirements (Release 14)", V1.1.0, Nov. 2016, 22 pages.

3GPP TS 28.521, "3rd Generation Partnership Project; Technical Specification Group Services and System Aspects; Telecommunication management; Performance Management (PM) for mobile networks that include virtualized network functions; Procedures (Release 14)", V14.0.0, Jun. 2017, 12 pages.

3GPP TS 32.412, "3rd Generation Partnership Project; Technical Specification Group Services and System Aspects; Telecommunication management; Performance Management (PM) Integration Reference Point (IRP): Information Service (IS) (Release 14)", V14.0.0, Dec. 2016, 68 pages.

3GPP TS 32.412, "3rd Generation Partnership Project; Technical Specification Group Services and System Aspects; Telecommunication management; Performance Management (PM) Integration Reference Point (IRP): Infromation Service (IS)(Release 13)", V13.0.0, Jan. 2016, 70 pages.

ETSI GS NFV-IFA 008, "Network Function Virtualisation (NFV); Management and Orchestration; Ve-Vnfm reference point—Interface and Information Model Specification", V2.1.1, Oct. 2016, 83 pages.

Intel, "Modification of use case on measurement job suspension for PM data related to VR", S5-171266, revision of S5-171186, 3GPP TSG SA WG5 (Telecom Management) Meeting #111, Porto (Portugal), Agenda Item 6.4.1.4, Jan. 16-20, 2017, 3 pages.

PCT/US2017/067398, International Search Report and Written Opinion, dated May 7, 2018, 27 pages.

* cited by examiner

MEASUREMENT JOB SUSPENSION AND RESUMPTION IN NETWORK FUNCTION VIRTUALIZATION

RELATED APPLICATIONS

This application is a national stage filing under 35 U.S.C. § 371 of International Patent Application No. PCT/US2017/067398, filed Dec. 19, 2017, which claims the benefit under 35 U.S.C. § 119(e) of U.S. Provisional Patent Application No. 62/443,256, filed Jan. 6, 2017, each of which is hereby incorporated by reference herein in its entirety.

TECHNICAL FIELD

Various embodiments may relate to the field of wireless communications. More particularly, this disclosure is directed to measurement job suspension and resumption in network function virtualization.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, new radio (NR) node or g Node B (gNB).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, and the E-UTRAN implements LTE RAT.

A core network can be connected to the UE through the RAN Node. The core network can include a serving gateway (SGW), a packet data network (PDN) gateway (PGW), an access network detection and selection function (ANDSF) server, an enhanced packet data gateway (ePDG) and/or a mobility management entity (MME).

DETAILED DESCRIPTION OF PREFERRED EMBODIMENTS

Figure 1:
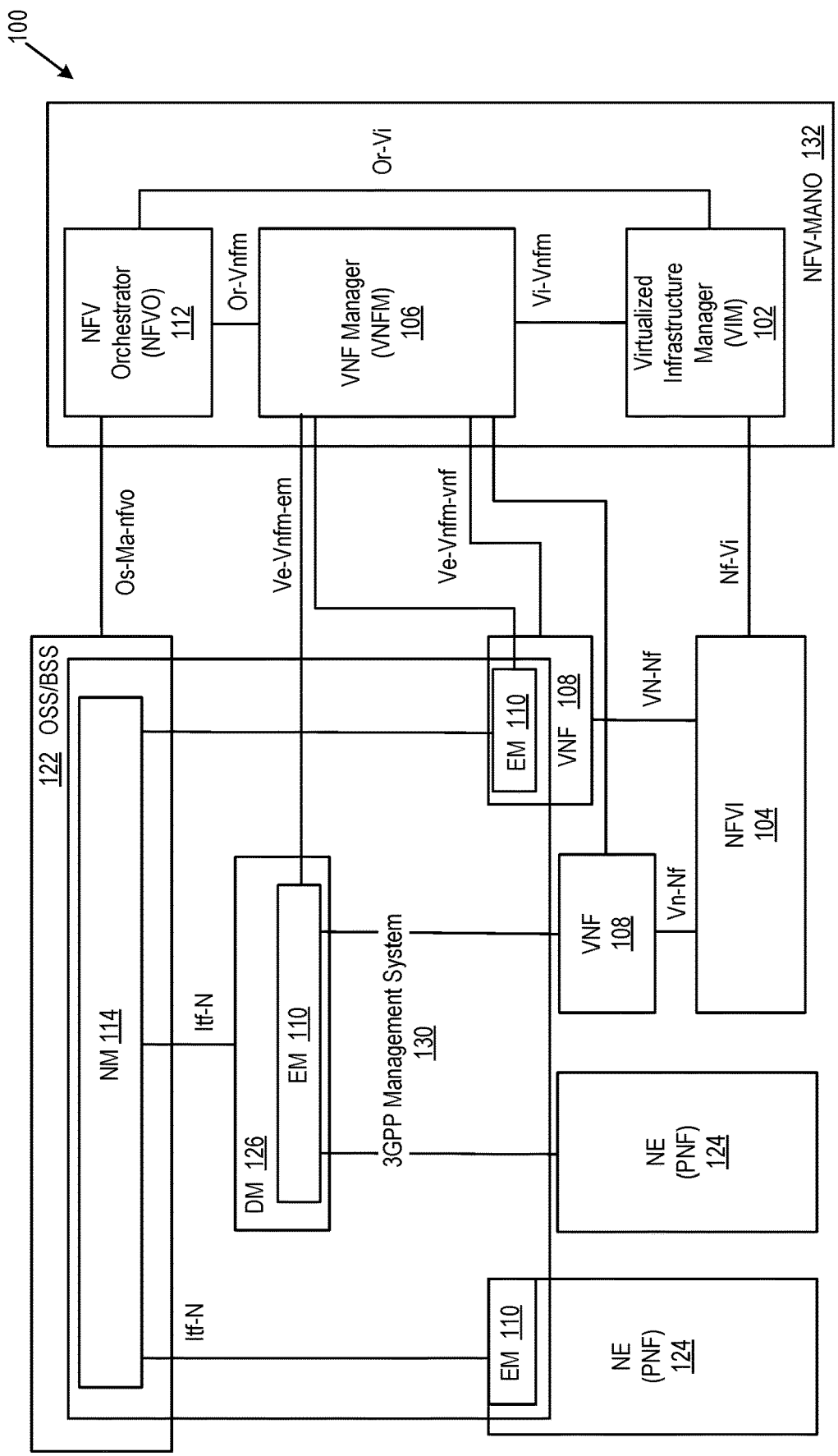
FIG. 1 is a diagram illustrating a network management architecture for virtualized network functions or network function virtualization according to certain embodiments.

A detailed description of systems and methods consistent with embodiments of the present disclosure is provided below. While several embodiments are described, it should be understood that the disclosure is not limited to any one embodiment, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

A virtualized network function (VNF) instance may include multiple network functions, and it may be up to a vendor's implementation to incorporate which network functions (NFs) to include in one VNF instance. Therefore, a 3GPP network manager (NM), which is responsible for managing a 3GPP defined network function part of a VNF instance, may need to know a network function performance related to a virtualized resource (VR), rather than VNF performance related to the VR. Performance management (PM) job suspension and resumption are not yet supported by certain NFV standards (e.g., ETSI GS NFV-IFA 008 for the Ve-Vnfm reference point-interface). However, it may be beneficial to provide measurement job suspension resumption initiated over the Itf-N interface.

Accordingly, certain embodiments herein provide a solution on the Ve-Vnfm-em reference point to support measurement job suspension and resumption for NF performance measurements initiated over the Itf-N. Certain embodiments herein relate to solutions using PM job creation and deletion on Ve-Vnfm-em a reference point to support the measurement job suspension and resumption for NF performance measurements related to VR initiated by Itf-N.

In an example embodiment, an NM may include one or more processors to request an element manager (EM) to suspend a measurement job for NF performance measurements related to VR, and to receive a response from the EM about the result of the measurement job suspension. In certain such embodiments, the EM may include one or more processors to receive a request from the NM to suspend a measurement job for NF performance measurements related to VR, stop the collection of the measurement result data by the measurement job, request a virtualized network function manager (VNFM) to delete the PM jobs that were used to support the measurement job, receive the response from VNFM about the result of the PM job(s) deletion, and send a response to the NM about the result of the measurement job suspension. In addition, or in other embodiments, the VNFM may include one or more processors to receive a request from the EM to delete one or more PM jobs, delete the PM job(s), and send a response to the EM about the result of the PM job(s) deletion.

In another example embodiment, an NM may include one or more processors to request an EM to resume a measurement job for NF performance measurements related to VR, and receive a response from the EM about the result of the measurement job resumption. In certain such embodiments, the EM may include one or more processors to receive a request from the NM to resume a measurement job for NF performance measurements related to VR, request a VNFM to create the PM job(s) to support the measurement job if the PM jobs used to support the measurement job do not exist anymore, receive a response from the VNFM about the result of the PM job(s) creation, and send a response to the NM about the result of the measurement job resumption. In addition, or in other embodiments, the VNFM may include one or more processors to receive a request from the EM to create one or more PM jobs, create the PM job(s), and send a response to the EM about the result of the PM job(s) creation.

In certain embodiments, there can be one or more PM job(s) created by EM with VNFM to support the measurement job requested by NM.

In certain embodiments, the measurement job is identified by a job identifier (jobId).

Certain embodiments include an apparatus comprising means to perform one or more elements of a method described in or related to any of the examples described herein.

Certain embodiments include one or more non-transitory computer-readable media comprising instructions to cause an electronic device, upon execution of the instructions by one or more processors of the electronic device, to perform one or more elements of a method described in or related to any of the examples described herein.

Certain embodiments include an apparatus comprising logic, modules, and/or circuitry to perform one or more elements of a method described in or related to any of the examples described herein.

Certain embodiments include a method, technique, or process as described in or related to any of the examples, or portions or parts thereof.

Certain embodiments include an apparatus comprising one or more processors and one or more computer readable media comprising instructions that, when executed by the one or more processors, cause the one or more processors to perform the method, techniques, or process as described in or related to any of examples, or portions thereof.

Certain embodiments include a method of communicating in a wireless network as shown and described herein.

Certain embodiments include a system for providing wireless communication as shown and described herein.

Certain embodiments include a device for providing wireless communication as shown and described herein.

An EM may map the measurement job for NF performance measurements related to VR to the PM job(s) for VNF or virtualized network function component (VNFC) performance measurements related to VR, and manage the PM job(s) for VNF/VNFC performance measurements with the VNFM.

In some embodiments, virtualized can be spelled as virtualised, however the meaning is the same.

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

FIG. 1 is a diagram illustrating a network management architecture 100 for virtualized network functions (VNFs or network function virtualization (NFV) more generally). The illustrated network management architecture 100 is provided by way of example only and skilled persons will recognize from the disclosure herein that the described embodiments may also be used with other virtualized network architectures. The components shown in FIG. 1, according to some example embodiments, can support NFV. The system 100 is illustrated as including a virtualized infrastructure manager (VIM) 102, a network function virtualization infrastructure (NFVI) 104, a VNF manager (VNFM) 106, virtualized network functions (VNFs) 108, an element manager (EM) 110, an NFV orchestrator (NFVO) 112, and a network manager (NM) 114 within an operation support system/business support system (OSS/BSS) 122.

The VIM 102 manages the resources of the NFVI 104. The NFVI 104 can include physical or virtual resources and applications (including hypervisors) used to execute the system 100. The VIM 102 may manage the life cycle of virtual resources with the NFVI 104 (e.g., creation, maintenance, and tear down of virtual machines (VMs) associated with one or more physical resources), track VM instances, track performance, fault and security of VM instances and associated physical resources, and expose VM instances and associated physical resources to other management systems.

The VNFM 106 may manage the VNFs 108. The VNFs 108 may be used to execute IMS, EPC and 5G (5GC and NG-RAN) components/functions. The VNFM 106 may manage the life cycle of the VNFs 108 and track performance, fault and security of the virtual aspects of VNFs 108. The EM 110 may track the performance, fault and security of the functional aspects of VNFs 108 and physical network functions (PNFs) 124. The tracking data from the VNFM 106 and the EM 110 may comprise, for example, performance measurement (PM) data used by the VIM 102 or the NFVI 104. Both the VNFM 106 and the EM 110 can scale up/down the quantity of VNFs 108 of the system 100. In some embodiments, the EM 110 is responsible for fault, configuration, accounting, performance and security management (FCAPS). In other embodiments, the EM 110 can manage multiple VNFs 108 or multiple EMs 110 manage a single VNF 108 each. In an embodiment, the EM 110 can be a VNF 108 itself. In an embodiment, the combination of the NM 114, a domain manager (DM) 126 and/or the EM 110 is considered to be a third generation partnership project (3GPP) management system 130.

The NFVO 112 may coordinate, authorize, release and engage resources of the NFVI 104 in order to provide the requested network service (e.g., which may be used to execute an EPC function, component, or slice). The NM 114 may provide a package of end-user functions with the responsibility for the management of a network, which may include network elements with VNFs 108, non-virtualized network functions, or both (management of the VNFs 108 may occur via the EM 110). The OSS portion of the OSS/BSS 122 is responsible for network management, fault management, configuration management and service management. The BSS portion of the OSS/BSS 122 is responsible for customer management, product management and order management. In the NFV architecture, the current BSS/OSS 122 of an operator may be interworking with an NFV management and orchestration (NFV-MANO) 132 using standard interfaces (or reference points).

Interconnection points (or reference points) between functional blocks can expose an external view of a functional block. These can include OS-Ma-nfvo between the NM 114 and NFVO 112; Ve-VNFM-em between the EM 110 and the VNFM 106; Ve-Vnfm-vnf between a VNF 108 and VNFM 106; Or-Vnfm between the NFVO 112 and the VNFM 106; Or-Vi between the NFVO 112 and the VIM 102; Vi-Vnfm between the VNFM 106 and VIM 102; NF-Vi between the NFVI 104 and the VIM 102; VN-Nf between the NFVI 104 and VNF 108; and Itf-N between the EM 110 or DM 126 and NM 114.

A virtualized resource performance management interface has been defined for reference point Vi-Vnfm between VIM 102 and VNFM 106 as shown in FIG. 1. The operations to create a PM job and notify the availability of PM data can be transmitted using the above-mentioned interface. The usage of an individual virtual CPU (sometimes called a virtual processor or vCPU) is a part of a virtualized resource (VR), or the consolidated usage of all virtual CPUs of a Virtualized Compute Resource and can be monitored by a performance measurement.

In certain embodiments, when the PM data is collected (i.e. PM data related to 3GPP Network Function and 3GPP NF PM data related to VR), the NM 114 creates a PM collection task at the EM 110 so that the EM 110 knows the measurement types, the measured resources, the recording periods and collection times wanted. For PM data related to 3GPP network function collection, the EM 110 requests VNF(s) to collect the PM data related to 3GPP network function as specified by the NM 114. For VNF PM data related to VR collection, the EM 110 creates a PM collection task at the VNFM 106 to collect VNF/VNFC PM data related to VR, based on the information provided by the NM 114 so that the VNFM 106 knows the measurement types, the measured resources, the recording periods, and collection times wanted. Then, the VNFM 106 creates a PM collection task at the VIM 102 based on the information provided by the EM 110. The VIM 102 requests the NFVI 104 to collect the VR PM data as specified by the VNFM 106.

Figure 2:
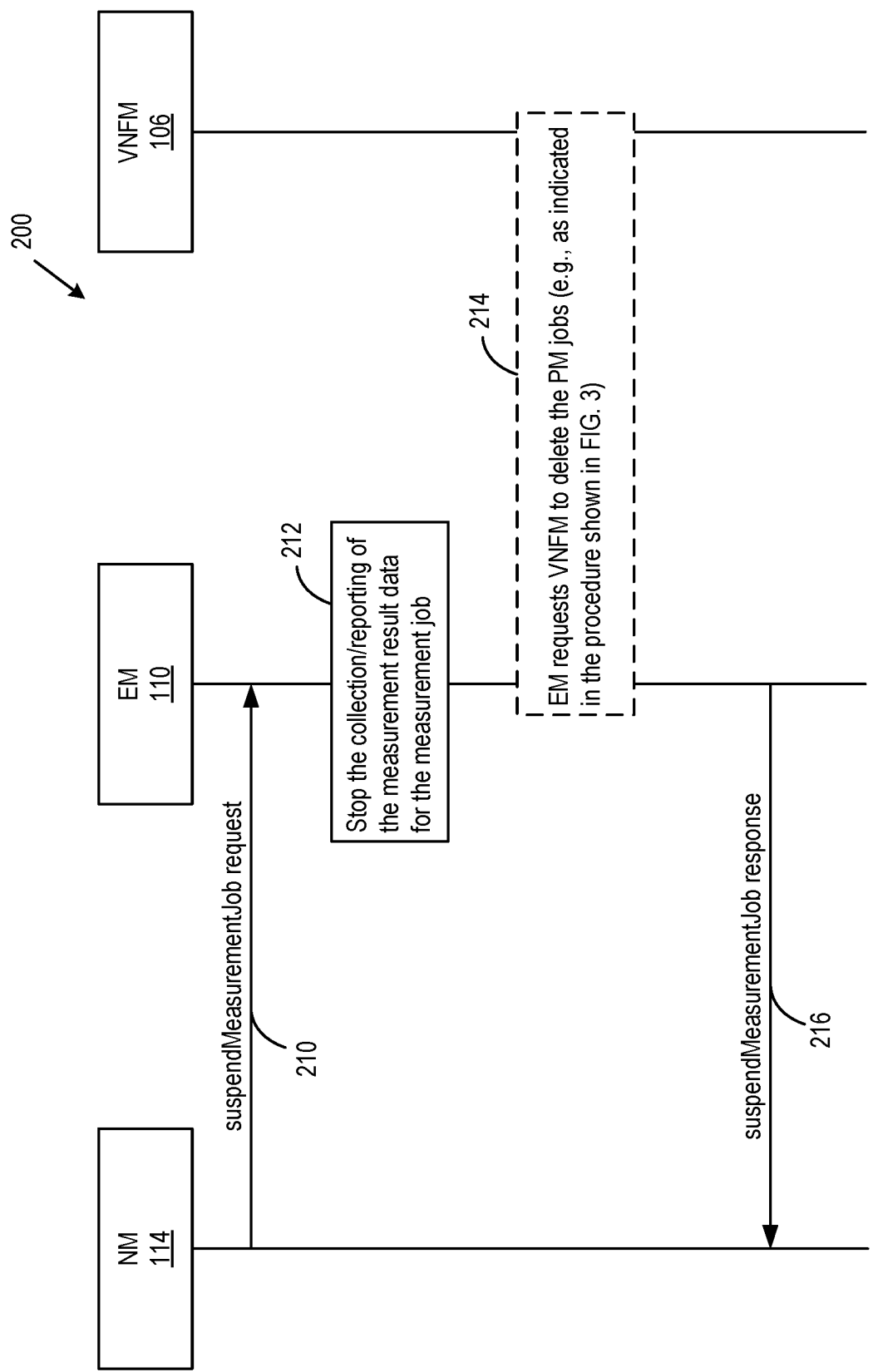
FIG. 2 is a sequence diagram illustrating a measurement job suspension procedure according to certain embodiments.

FIG. 2 is a sequence diagram illustrating a measurement job suspension procedure 200 according to certain embodiments. The measurement job suspension procedure 200 may be for 3GPP or other network NF performance measurements related to VR. In this example, the NM 114 invokes a suspendMeasurementJob operation (e.g., see clause 7.3.3 of 3GPP TS 32.412) by sending a suspendMeasurementJob request 210 with a jobId to request the EM 110 to suspend the measurement job corresponding to the jobId for NF performance measurements related to VR. After receiving the suspendMeasurementJob request 210, at block 210, the EM 110 stops the collection and/or reporting of the measurement result data for the measurement job. In certain optional embodiments, as shown at block 214, the EM 110 may request the VNFM 106 to delete the PM jobs identified by one or more PM job identifier (pmJobId) that were used to support the measurement job identified by the jobId (e.g., as indicated in the procedure shown in FIG. 3). The EM 110 then responds to the suspendMeasurementJob operation by sending a suspendMeasurementJob response 216 to the NM 114.

In certain embodiments, the measurement job suspension procedure 200 may be further defined by TABLE 1, which shows example use case information for measurement job suspension for NF performance measurements related to VR. The NM 114 may decide to suspend the measurement job when, for example, a high workload is experienced by a managed system, the specified measurement data is not needed in a specific time duration, and/or in other situations or to meet specific requirements.

TABLE 1

| | Evolution/Specification |
|---|---|
| Use case stage | |
| Goal | Enable NM to suspend a measurement job that is collecting the 3GPP NF performance measurements related to VR. |
| Actors and Roles | NM |
| Telecom resources | NM, EM, VNFM |
| Assumptions | The VNF instance is in operation. |
| Pre-conditions | A measurement job exists for collecting the 3GPP NF performance measurements related to VR. |
| Begins when | NM decides to suspend the measurement job. |
| Step 1 (M) | NM sends a request to EM with the jobId to suspend a measurement job (e.g., see clause 7.3.3 of 3GPP TS 32.412). |
| Step 2 (M) | EM stops the reporting of the measurement result data for the measurement job identified by the jobId. |
| Step 3 (O) | EM may send a request to VNFM to delete the PM job(s), identified by the pmJobId that were used to support the measurement job identified by the jobId.<br>It is up to EM to decide whether to delete the above-mentioned PM jobs through VNFM. |
| Step 4 (O) | VNFM sends a response to EM with the identifier of the performance job being deleted. |

TABLE 1-continued

| | Evolution/Specification |
|---|---|
| Step 5 (M) | EM sends a response to NM to indicate the result of measurement job suspension (e.g., see clause 7.3.3.3 of 3GPP TS 32.412). |
| Ends when (*) | NM receives the response. |
| Exceptions | |
| Post-conditions | The measurement job is suspended. |
| Traceability (*) | REQ-NFV_PM_Itf-N-FUN-7, REQ-NFV_PM_Ve-Vnfm-em-FUN-6, REQ-NFV_PM_Ve-Vnfm-em-FUN-2 |

In TABLE 1, REQ-NFV_PM_Itf-N-FUN-7 indicates that an indication reference point agent (IRPAgent) should have the capability of allowing IRPmanager to suspend a measurement job for 3GPP NF performance measurements related to VR, REQ-NFV_PM_Ve-Vnfm-em-FUN-6 indicates that an IRPAgent should have the capability of allowing IRPManager to list the detailed information of a threshold for the 3GPP NF performance measurements related to VR, and REQ-NFV_PM_Ve-Vnfm-em-FUN-2 indicates that an IRPAgent should have the capability of allowing IRPManager to create measurement job for collecting the 3GPP NF performance measurements related to VR.

Figure 3:
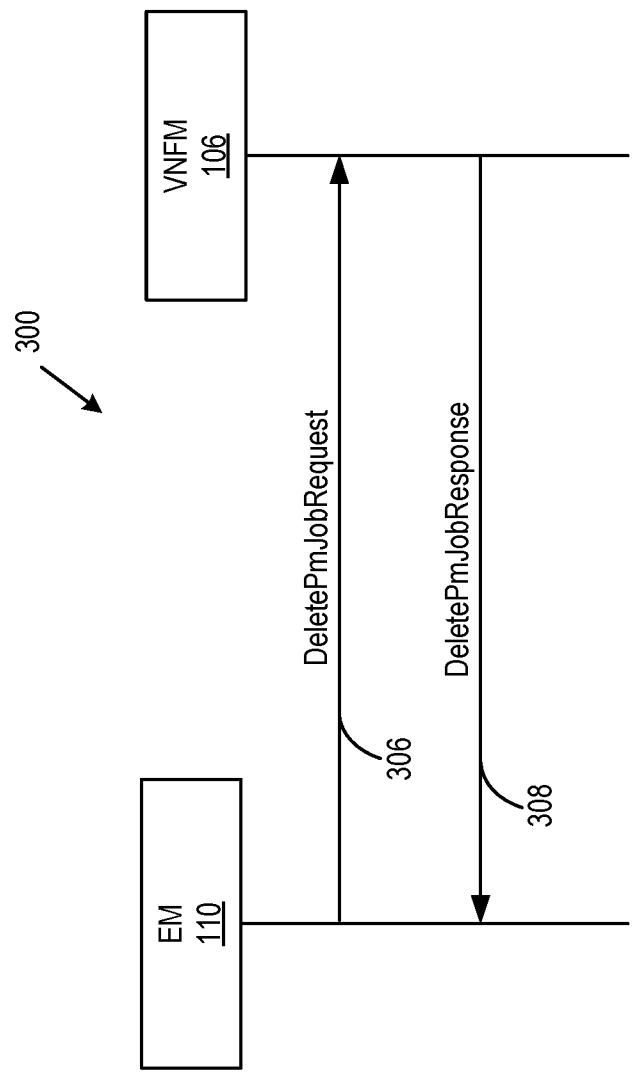
FIG. 3 is a sequence diagram illustrating a performance management job deletion procedure according to certain embodiments.

FIG. 3 is a sequence diagram illustrating a PM job deletion procedure 300 according to certain embodiments. The PM job deletion procedure 300 may be for VNF/VNFC performance measurements related to VR. In this example, the EM 110 sends a DeletePmJobRequest 306 to the VNFM 106 with the pmJobId (e.g., see clause 7.4.3.2 of ETSI GS NFV-IFA008) to identify the PM jobs to be deleted. The VNFM 106 sends a DeletePmJobResponse 308 to the EM 110 with deletedPmJobId (e.g., see clause 7.4.3.3 of ETSI GS NFV-IFA008) to identify the PM jobs that have been deleted.

Figure 4:
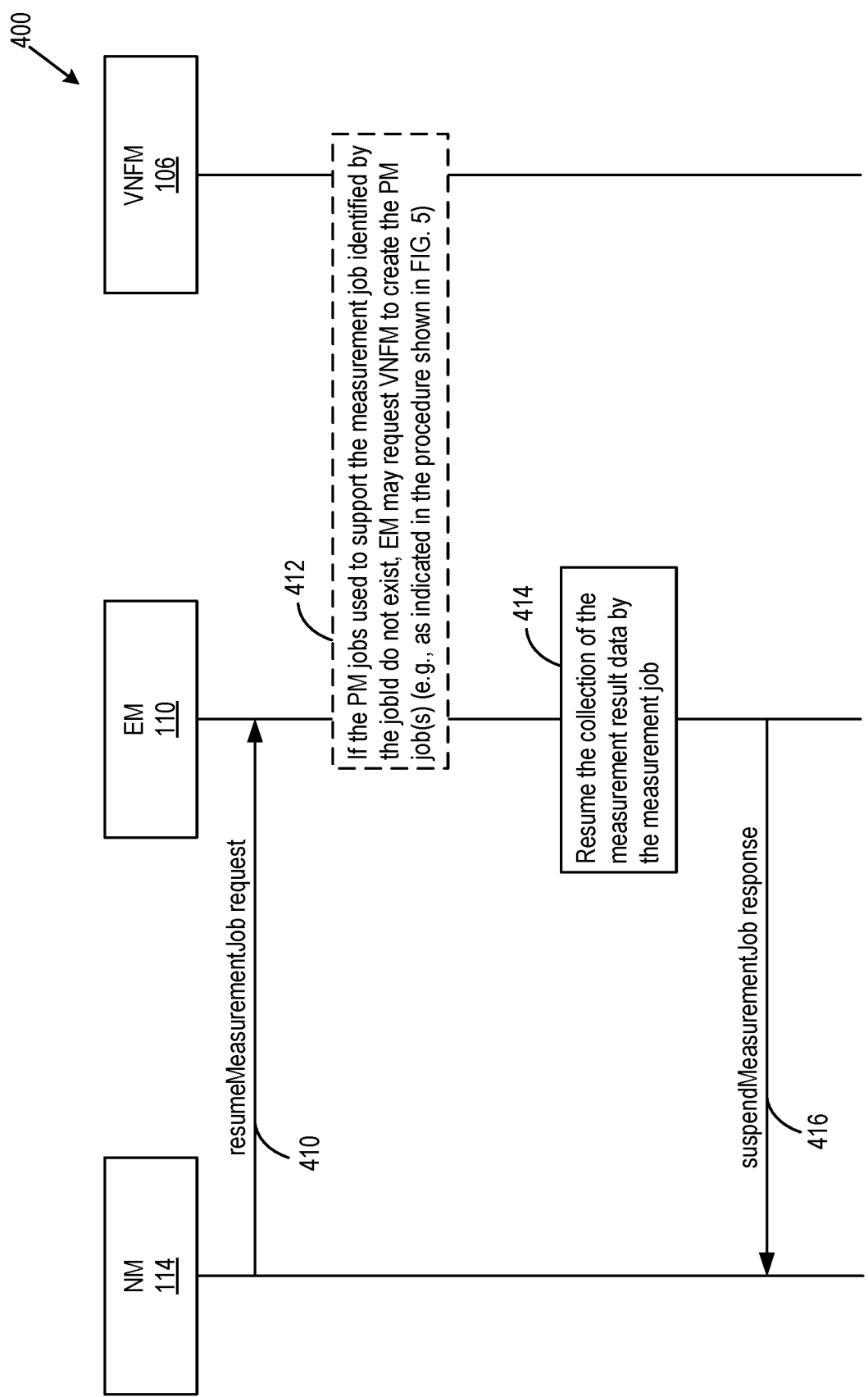
FIG. 4 is a sequence diagram illustrating a measurement job resumption procedure according to certain embodiments.

FIG. 4 is a sequence diagram illustrating a measurement job resumption procedure 400 according to certain embodiments. The measurement job resumption procedure 400 may be for 3GPP or other network NF performance measurements related to VR. In this example, the NM 114 invokes a resumeMeasurementJob operation (e.g., see clause 7.3.3 of 3GPP TS 32.412) by sending a resumeMeasurementJob request 410 with a jobId to request the EM 110 to resume the measurement job corresponding to the jobId for NF performance measurements related to VR. In certain optional embodiments, as shown at block 412, if the PM jobs used to support the measurement job identified by the jobId do not exist, the EM 110 may request the VNFM 106 to create the PM job(s) (e.g., as indicated in the procedure shown in FIG. 5). At block 414, the EM 110 resumes the reporting of the measurement result data for the measurement job identified by the jobId. The EM 110 then responds to the resumeMeasurementJob operation (e.g., see clause 7.3.1 of 3GPP TS 32.412) by sending a resumeMeasurementJob response 416 to the NM 114 with the result of the measurement job resumption.

In certain embodiments, the measurement job resumption procedure 400 may be further defined by TABLE 2, which shows example use case information for measurement job resumption for NF performance measurements related to VR.

TABLE 2

| | Evolution/Specification |
|---|---|
| Use case stage | |
| Goal | Enable NM to resume a suspended measurement job for 3GPP NF performance measurements related to VR. |
| Actors and Roles | NM |
| Telecom resources | NM, EM, VNFM |
| Assumptions | The VNF instance is in operation. |
| Pre-conditions | EM supports the Optional operation suspend. A measurement job for 3GPP NF performance measurements related to VR has been suspended. |
| Begins when | NM decides to resume the suspended measurement job. |
| Step 1 (M) | NM sends a request to EM with the jobId to resume a suspended measurement job (e.g., see clause 7.3.4 3GPP TS 32.412). |
| Step 2 (CM) | If the PM jobs used to support the measurement job identified by the jobId do not exist anymore, EM sends a request to VNFM to create the PM job(s). The condition of the support qualifier is: the PM jobs used to support the measurement job identified by the jobId do not exist anymore. |
| Step 3 (CM) | VNFM sends a response to EM with the identifier of the PM job(s) being created. The condition of the support qualifier is: step 2 has been executed. |
| Step 4 (M) | EM sends a response to NM to indicate the measureemnt job has been resumed (e.g., see clause 7.3.4.3 3GPP TS 32.412). |
| Ends when (*) | NM receives the response. |
| Exceptions | |
| Post-conditions | The measurement job is resumed. |
| Traceability (*) | REQ-NFV_PM_Itf-N-FUN-8, REQ-NFV_PM_Ve-Vnfm-em-FUN-7, REQ-NFV_PM_Ve-Vnfm-em-FUN-2 |

In TABLE 1 and TABLE 2, certain example compliance rules may designate qualifiers for certain steps, such as mandatory (M), optional (O), and/or conditional (C). These qualifiers are provided by way of example only and not to limit the disclosure.

In TABLE 2, REQ-NFV_PM_Itf-N-FUN-8 indicates that an IRPAgent should have the capability allowing IRPManager to resume a measurement job for 3GPP NF performance measurements related to VR, REQ-NFV_PM_Ve-Vnfm-em-FUN-7 indicates that an IRPAgent should have the capability allowing IRPmanager to suspend a measurement job for 3GPP NF performance measurements related to VR, and REQ-NFV_PM_Ve-Vnfm-em-FUN-2 indicates that an IRPAgent should have the capability allowing IRPManager to create measurement job for collecting the 3GPP NF performance measurements related to VR.

Figure 5:
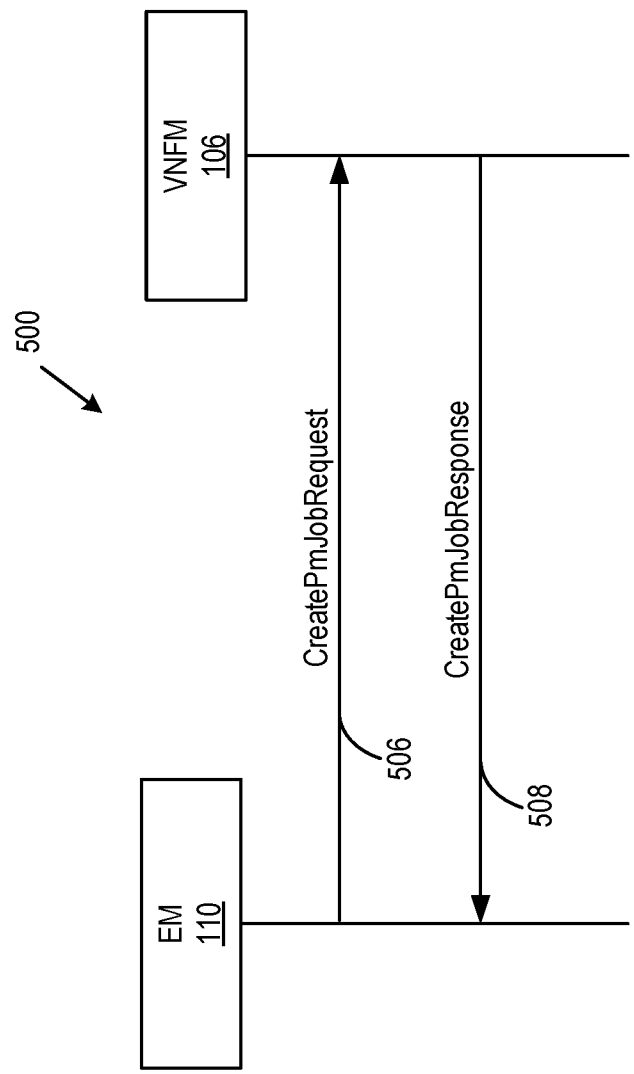
FIG. 5 is a sequence diagram illustrating a performance management job creation procedure according to certain embodiments.

FIG. 5 is a sequence diagram illustrating a PM job creation procedure 500 according to certain embodiments. In this example, the EM 110 sends a CreatePmJobRequest 506 to the VNFM 106 with the following parameters (e.g., see clause 7.6.2.2 of ETSI GS NFV-IFA008) to create a PM job: a sourceSelector that identifies the VNF/VNFC for which the PM data is to be collected; a performanceMetric or performanceMetricGroup (only one may be needed) that defines the type of performance metric(s), or the group of performance metric(s); a collectionPeriod that specifies the periodicity at which the VNFM 106 collects performance information; a reportingPeriod that specifies the periodicity at which the VNFM 106 reports to the EM 110 about performance information; and a reportingBoundary that identifies a boundary after which the reporting will stop, and is optional. The VNFM 106 sends a CreatePmJobResponse 508 to the EM 110 with the pmJobId (e.g., see clause 7.6.2.3 of ETSI GS NFV-IFA008) to indicate the PM job that has been created.

Figure 6:
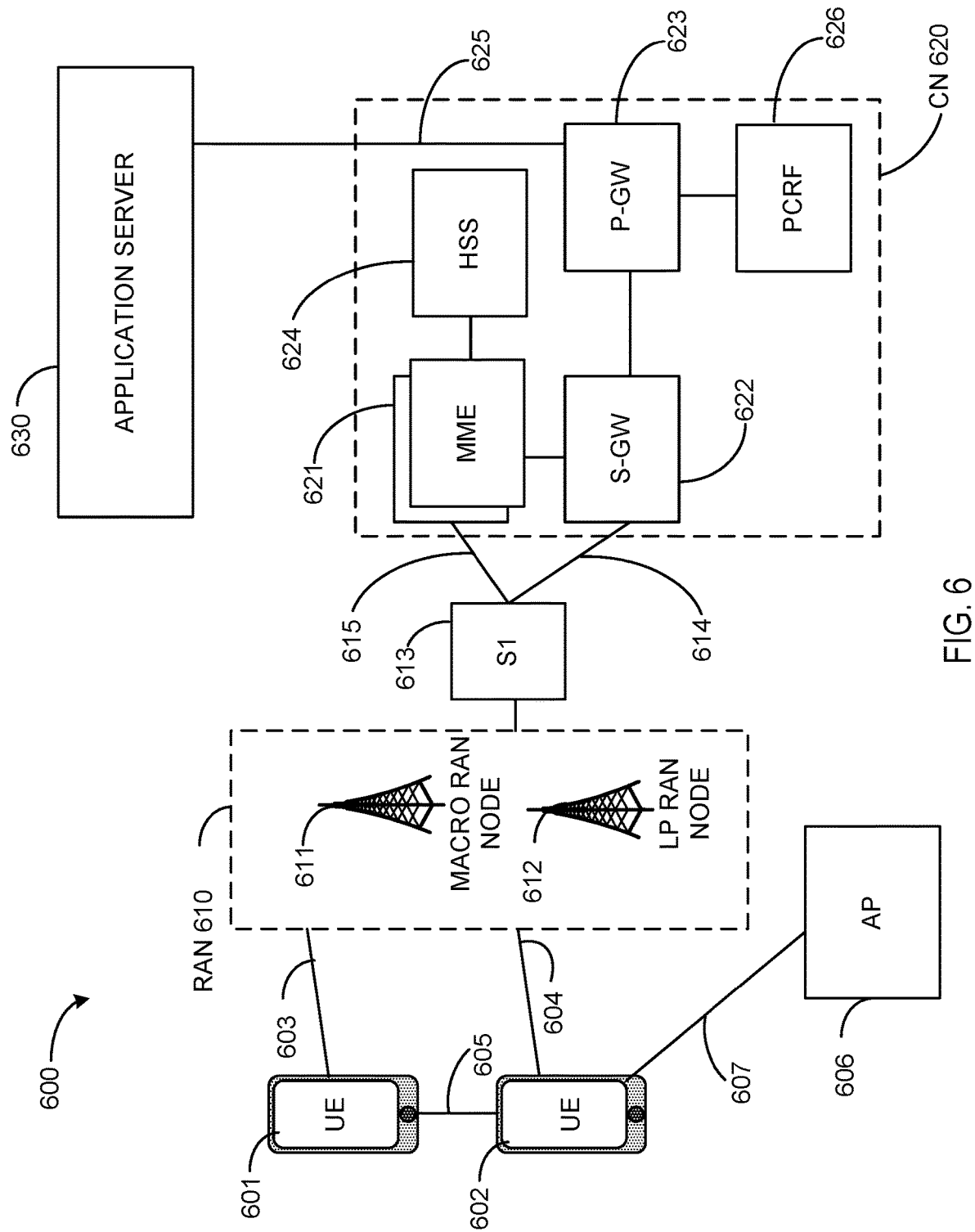
FIG. 6 illustrates an architecture of a system of a network in accordance with some embodiments.

FIG. 6 illustrates an architecture of a system 600 of a network in accordance with some embodiments. The system 600 is shown to include a user equipment (UE) 601 and a UE 602. The UEs 601 and 602 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 601 and 602 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 601 and 602 may be configured to connect, e.g., communicatively couple, with a radio access network (RAN) 610. The RAN 610 may be, for example, an Evolved Universal Mobile Telecommunications System (UMTS) Terrestrial Radio Access Network (E-UTRAN), a NextGen RAN (NG RAN), or some other type of RAN. The UEs 601 and 602 utilize connections 603 and 604, respectively, each of which comprises a physical communications interface or layer (discussed in further detail below); in this example, the connections 603 and 604 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 601 and 602 may further directly exchange communication data via a ProSe interface 605. The ProSe interface 605 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 602 is shown to be configured to access an access point (AP) 606 via connection 607. The connection 607 can comprise a local wireless connection, such as a connection consistent with any IEEE 802.11 protocol, wherein the AP 606 would comprise a wireless fidelity (WiFi®) router. In this example, the AP 606 may be connected to the Internet without connecting to the core network of the wireless system (described in further detail below).

The RAN 610 can include one or more access nodes that enable the connections 603 and 604. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 610 may include one or more RAN nodes for providing macrocells, e.g., macro RAN node 611, and one or more RAN nodes for providing femtocells or picocells (e.g., cells having smaller coverage areas, smaller user capacity, or higher bandwidth compared to macrocells), e.g., low power (LP) RAN node 612.

Any of the RAN nodes 611 and 612 can terminate the air interface protocol and can be the first point of contact for the UEs 601 and 602. In some embodiments, any of the RAN nodes 611 and 612 can fulfill various logical functions for the RAN 610 including, but not limited to, radio network controller (RNC) functions such as radio bearer management, uplink and downlink dynamic radio resource management and data packet scheduling, and mobility management.

In accordance with some embodiments, the UEs 601 and 602 can be configured to communicate using Orthogonal Frequency-Division Multiplexing (OFDM) communication signals with each other or with any of the RAN nodes 611 and 612 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 611 and 612 to the UEs 601 and 602, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 601 and 602. The physical downlink control channel (PDCCH) may carry information about the transport format and resource allocations related to the PDSCH channel, among other things. It may also inform the UEs 601 and 602 about the transport format, resource allocation, and H-ARQ (Hybrid Automatic Repeat Request) information related to the uplink shared channel. Typically, downlink scheduling (assigning control and shared channel resource blocks to the UE 602 within a cell) may be performed at any of the RAN nodes 611 and 612 based on channel quality information fed back from any of the UEs 601 and 602. The downlink resource assignment information may be sent on the PDCCH used for (e.g., assigned to) each of the UEs 601 and 602.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 610 is shown to be communicatively coupled to a core network (CN) 620—via an S1 interface 613. In embodiments, the CN 620 may be an evolved packet core (EPC) network, a NextGen Packet Core (NPC) network, or some other type of CN. In this embodiment the S1 interface 613 is split into two parts: the S1-U interface 614, which carries traffic data between the RAN nodes 611 and 612 and a serving gateway (S-GW) 622, and an S1-mobility management entity (MME) interface 615, which is a signaling interface between the RAN nodes 611 and 612 and MMEs 621.

In this embodiment, the CN 620 comprises the MMEs 621, the S-GW 622, a Packet Data Network (PDN) Gateway (P-GW) 623, and a home subscriber server (HSS) 624. The MMEs 621 may be similar in function to the control plane of legacy Serving General Packet Radio Service (GPRS) Support Nodes (SGSN). The MMEs 621 may manage mobility aspects in access such as gateway selection and tracking area list management. The HSS 624 may comprise a database for network users, including subscription-related information to support the network entities' handling of communication sessions. The CN 620 may comprise one or several HSSs 624, depending on the number of mobile subscribers, on the capacity of the equipment, on the organization of the network, etc. For example, the HSS 624 can provide support for routing/roaming, authentication, authorization, naming/addressing resolution, location dependencies, etc.

The S-GW 622 may terminate the S1 interface 613 towards the RAN 610, and routes data packets between the RAN 610 and the CN 620. In addition, the S-GW 622 may be a local mobility anchor point for inter-RAN node handovers and also may provide an anchor for inter-3GPP mobility. Other responsibilities may include lawful intercept, charging, and some policy enforcement.

The P-GW 623 may terminate an SGi interface toward a PDN. The P-GW 623 may route data packets between the CN 620 (e.g., an EPC network) and external networks such as a network including the application server 630 (alternatively referred to as application function (AF)) via an Internet Protocol (IP) interface 625. Generally, an application server 630 may be an element offering applications that use IP bearer resources with the core network (e.g., UMTS Packet Services (PS) domain, LTE PS data services, etc.). In this embodiment, the P-GW 623 is shown to be communicatively coupled to an application server 630 via an IP communications interface 625. The application server 630 can also be configured to support one or more communication services (e.g., Voice-over-Internet Protocol (VoIP) sessions, PTT sessions, group communication sessions, social networking services, etc.) for the UEs 601 and 602 via the CN 620.

The P-GW 623 may further be a node for policy enforcement and charging data collection. A Policy and Charging Enforcement Function (PCRF) 626 is the policy and charging control element of the CN 620. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 626 may be communicatively coupled to the application server 630 via the P-GW 623. The application server 630 may signal the PCRF 626 to indicate a new service flow and select the appropriate Quality of Service (QoS) and charging parameters. The PCRF 626 may provision this rule into a Policy and Charging Enforcement Function (PCEF) (not shown) with the appropriate traffic flow template (TFT) and QoS class of identifier (QCI), which commences the QoS and charging as specified by the application server 630.

Figure 7:
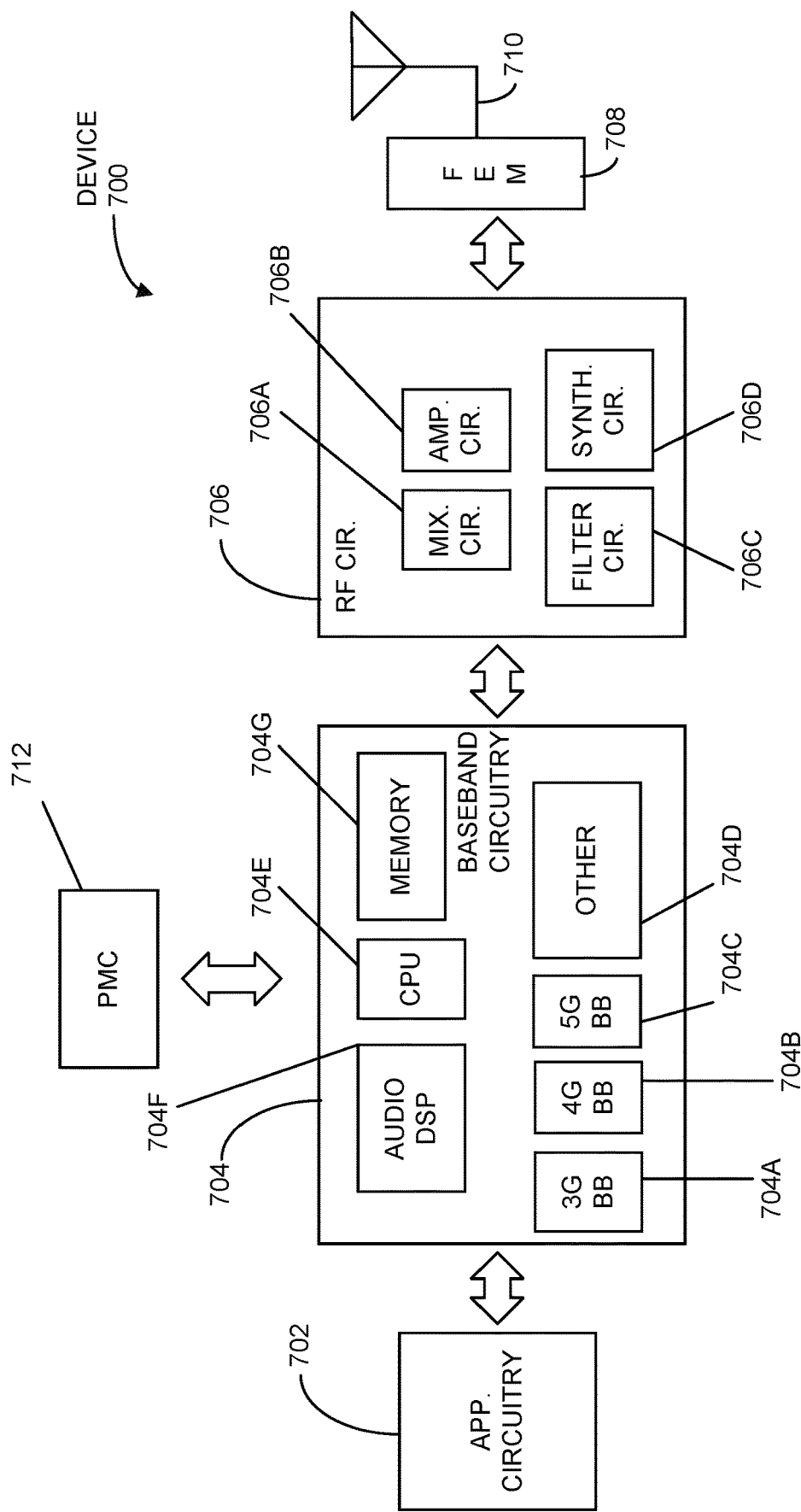
FIG. 7 illustrates example components of a device in accordance with some embodiments.

FIG. 7 illustrates example components of a device 700 in accordance with some embodiments. In some embodiments, the device 700 may include application circuitry 702, baseband circuitry 704, Radio Frequency (RF) circuitry 706, front-end module (FEM) circuitry 708, one or more antennas 710, and power management circuitry (PMC) 712 coupled together at least as shown. The components of the illustrated device 700 may be included in a UE or a RAN node. In some embodiments, the device 700 may include fewer elements (e.g., a RAN node may not utilize application circuitry 702, and instead include a processor/controller to process IP data received from an EPC). In some embodiments, the device 700 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 702 may include one or more application processors. For example, the application circuitry 702 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 700. In some embodiments, processors of application circuitry 702 may process IP data packets received from an EPC.

The baseband circuitry 704 may include circuitry such as, but not limited to, one or more single-core or multi-core processors. The baseband circuitry 704 may include one or more baseband processors or control logic to process baseband signals received from a receive signal path of the RF circuitry 706 and to generate baseband signals for a transmit signal path of the RF circuitry 706. Baseband processing circuitry 704 may interface with the application circuitry 702 for generation and processing of the baseband signals and for controlling operations of the RF circuitry 706. For example, in some embodiments, the baseband circuitry 704 may include a third generation (3G) baseband processor 704A, a fourth generation (4G) baseband processor 704B, a fifth generation (5G) baseband processor 704C, or other baseband processor(s) 704D for other existing generations, generations in development or to be developed in the future (e.g., second generation (2G), sixth generation (6G), etc.). The baseband circuitry 704 (e.g., one or more of baseband processors 704A-D) may handle various radio control functions that enable communication with one or more radio networks via the RF circuitry 706. In other embodiments, some or all of the functionality of baseband processors 704A-D may be included in modules stored in the memory 704G and executed via a Central Processing Unit (CPU) 704E. The radio control functions may include, but are not limited to, signal modulation/demodulation, encoding/decoding, radio frequency shifting, etc. In some embodiments, modulation/demodulation circuitry of the baseband circuitry 704 may include Fast-Fourier Transform (FFT), precoding, or constellation mapping/demapping functionality. In some embodiments, encoding/decoding circuitry of the baseband circuitry 704 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 704 may include one or more audio digital signal processor(s) (DSP) 704F. The audio DSP(s) 704F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 704 and the application circuitry 702 may be implemented together such as, for example, on a system on a chip (SOC).

In some embodiments, the baseband circuitry 704 may provide for communication compatible with one or more radio technologies. For example, in some embodiments, the baseband circuitry 704 may support communication with an evolved universal terrestrial radio access network (EUTRAN) or other wireless metropolitan area networks (WMAN), a wireless local area network (WLAN), or a wireless personal area network (WPAN). Embodiments in which the baseband circuitry 704 is configured to support radio communications of more than one wireless protocol may be referred to as multi-mode baseband circuitry.

RF circuitry 706 may enable communication with wireless networks using modulated electromagnetic radiation through a non-solid medium. In various embodiments, the RF circuitry 706 may include switches, filters, amplifiers, etc. to facilitate the communication with the wireless network. The RF circuitry 706 may include a receive signal path which may include circuitry to down-convert RF signals received from the FEM circuitry 708 and provide baseband signals to the baseband circuitry 704. RF circuitry 706 may also include a transmit signal path which may include circuitry to up-convert baseband signals provided by the baseband circuitry 704 and provide RF output signals to the FEM circuitry 708 for transmission.

In some embodiments, the receive signal path of the RF circuitry 706 may include mixer circuitry 706A, amplifier circuitry 706B and filter circuitry 706C. In some embodiments, the transmit signal path of the RF circuitry 706 may include filter circuitry 706C and mixer circuitry 706A. RF circuitry 706 may also include synthesizer circuitry 706D for synthesizing a frequency for use by the mixer circuitry 706A of the receive signal path and the transmit signal path. In some embodiments, the mixer circuitry 706A of the receive signal path may be configured to down-convert RF signals received from the FEM circuitry 708 based on the synthesized frequency provided by synthesizer circuitry 706D. The amplifier circuitry 706B may be configured to amplify the down-converted signals and the filter circuitry 706C may be a low-pass filter (LPF) or band-pass filter (BPF) configured to remove unwanted signals from the down-converted signals to generate output baseband signals. Output baseband signals may be provided to the baseband circuitry 704 for further processing. In some embodiments, the output baseband signals may be zero-frequency baseband signals, although this is not a requirement. In some embodiments, the mixer circuitry 706A of the receive signal path may comprise passive mixers, although the scope of the embodiments is not limited in this respect.

In some embodiments, the mixer circuitry 706A of the transmit signal path may be configured to up-convert input baseband signals based on the synthesized frequency provided by the synthesizer circuitry 706D to generate RF output signals for the FEM circuitry 708. The baseband signals may be provided by the baseband circuitry 704 and may be filtered by the filter circuitry 706C.

In some embodiments, the mixer circuitry 706A of the receive signal path and the mixer circuitry 706A of the transmit signal path may include two or more mixers and may be arranged for quadrature downconversion and upconversion, respectively. In some embodiments, the mixer circuitry 706A of the receive signal path and the mixer circuitry 706A of the transmit signal path may include two or more mixers and may be arranged for image rejection (e.g., Hartley image rejection). In some embodiments, the mixer circuitry 706A of the receive signal path and the mixer circuitry 706A may be arranged for direct downconversion and direct upconversion, respectively. In some embodiments, the mixer circuitry 706A of the receive signal path and the mixer circuitry 706A of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 706 may include analog-to-digital converter (ADC) and digital-to-analog converter (DAC) circuitry and the baseband circuitry 704 may include a digital baseband interface to communicate with the RF circuitry 706.

In some dual-mode embodiments, a separate radio IC circuitry may be provided for processing signals for each spectrum, although the scope of the embodiments is not limited in this respect.

In some embodiments, the synthesizer circuitry 706D may be a fractional-N synthesizer or a fractional N/N+1 synthesizer, although the scope of the embodiments is not limited in this respect as other types of frequency synthesizers may be suitable. For example, synthesizer circuitry 706D may be a delta-sigma synthesizer, a frequency multiplier, or a synthesizer comprising a phase-locked loop with a frequency divider.

The synthesizer circuitry 706D may be configured to synthesize an output frequency for use by the mixer circuitry 706A of the RF circuitry 706 based on a frequency input and a divider control input. In some embodiments, the synthesizer circuitry 706D may be a fractional N/N+1 synthesizer.

In some embodiments, frequency input may be provided by a voltage controlled oscillator (VCO), although that is not a requirement. Divider control input may be provided by either the baseband circuitry 704 or the application circuitry 702 (such as an applications processor) depending on the desired output frequency. In some embodiments, a divider control input (e.g., N) may be determined from a look-up table based on a channel indicated by the application circuitry 702.

Synthesizer circuitry 706D of the RF circuitry 706 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, the synthesizer circuitry 706D may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 706 may include an IQ/polar converter.

FEM circuitry 708 may include a receive signal path which may include circuitry configured to operate on RF signals received from one or more antennas 710, amplify the received signals and provide the amplified versions of the received signals to the RF circuitry 706 for further processing. The FEM circuitry 708 may also include a transmit signal path which may include circuitry configured to amplify signals for transmission provided by the RF circuitry 706 for transmission by one or more of the one or more antennas 710. In various embodiments, the amplification through the transmit or receive signal paths may be done solely in the RF circuitry 706, solely in the FEM circuitry 708, or in both the RF circuitry 706 and the FEM circuitry 708.

In some embodiments, the FEM circuitry 708 may include a TX/RX switch to switch between transmit mode and receive mode operation. The FEM circuitry 708 may include a receive signal path and a transmit signal path. The receive signal path of the FEM circuitry 708 may include an LNA to amplify received RF signals and provide the amplified received RF signals as an output (e.g., to the RF circuitry 706). The transmit signal path of the FEM circuitry 708 may include a power amplifier (PA) to amplify input RF signals (e.g., provided by the RF circuitry 706), and one or more filters to generate RF signals for subsequent transmission (e.g., by one or more of the one or more antennas 710).

In some embodiments, the PMC 712 may manage power provided to the baseband circuitry 704. In particular, the PMC 712 may control power-source selection, voltage scaling, battery charging, or DC-to-DC conversion. The PMC 712 may often be included when the device 700 is capable of being powered by a battery, for example, when the device 700 is included in a UE. The PMC 712 may increase the power conversion efficiency while providing desirable implementation size and heat dissipation characteristics.

FIG. 7 shows the PMC 712 coupled only with the baseband circuitry 704. However, in other embodiments, the PMC 712 may be additionally or alternatively coupled with, and perform similar power management operations for, other components such as, but not limited to, the application circuitry 702, the RF circuitry 706, or the FEM circuitry 708.

In some embodiments, the PMC 712 may control, or otherwise be part of, various power saving mechanisms of the device 700. For example, if the device 700 is in an RRC_Connected state, where it is still connected to the RAN node as it expects to receive traffic shortly, then it may enter a state known as Discontinuous Reception Mode (DRX) after a period of inactivity. During this state, the device 700 may power down for brief intervals of time and thus save power.

If there is no data traffic activity for an extended period of time, then the device 700 may transition off to an RRC_Idle state, where it disconnects from the network and does not perform operations such as channel quality feedback, handover, etc. The device 700 goes into a very low power state and it performs paging where again it periodically wakes up to listen to the network and then powers down again. The device 700 may not receive data in this state, and in order to receive data, it transitions back to an RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 702 and processors of the baseband circuitry 704 may be used to execute elements of one or more instances of a protocol stack. For example, processors of the baseband circuitry 704, alone or in combination, may be used to execute Layer 3, Layer 2, or Layer 1 functionality, while processors of the application circuitry 702 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 8:
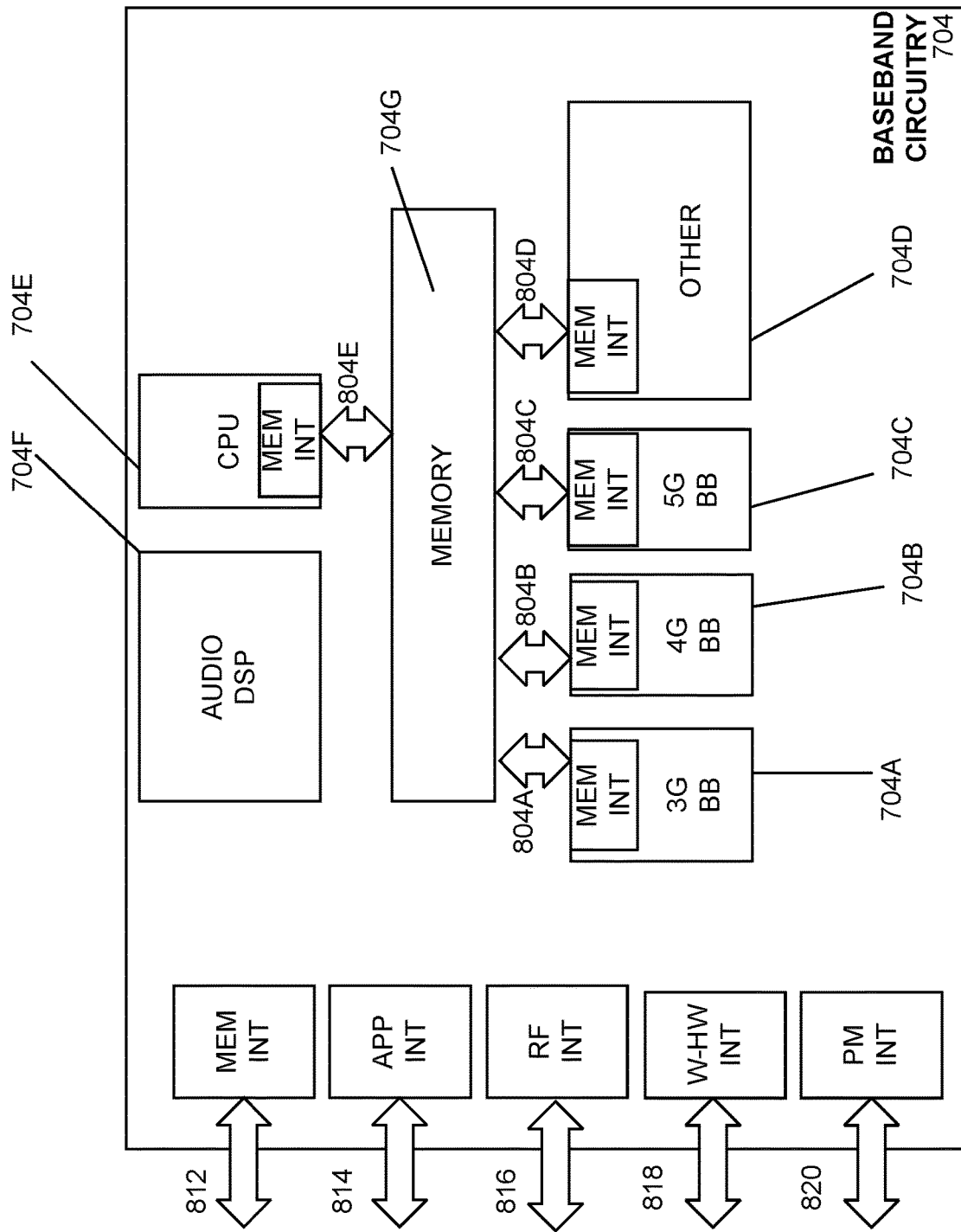
FIG. 8 illustrates example interfaces of baseband circuitry in accordance with some embodiments.

FIG. 8 illustrates example interfaces of baseband circuitry in accordance with some embodiments. As discussed above, the baseband circuitry 704 of FIG. 7 may comprise processors 704A-704E and a memory 704G utilized by said processors. Each of the processors 704A-704E may include a memory interface, 804A-804E, respectively, to send/receive data to/from the memory 704G.

The baseband circuitry 704 may further include one or more interfaces to communicatively couple to other circuitries/devices, such as a memory interface 812 (e.g., an interface to send/receive data to/from memory external to the baseband circuitry 704), an application circuitry interface 814 (e.g., an interface to send/receive data to/from the application circuitry 702 of FIG. 7), an RF circuitry interface 816 (e.g., an interface to send/receive data to/from RF circuitry 706 of FIG. 7), a wireless hardware connectivity interface 818 (e.g., an interface to send/receive data to/from Near Field Communication (NFC) components, Bluetooth® components (e.g., Bluetooth® Low Energy), Wi-Fi® components, and other communication components), and a power management interface 820 (e.g., an interface to send/receive power or control signals to/from the PMC 712.

Figure 9:
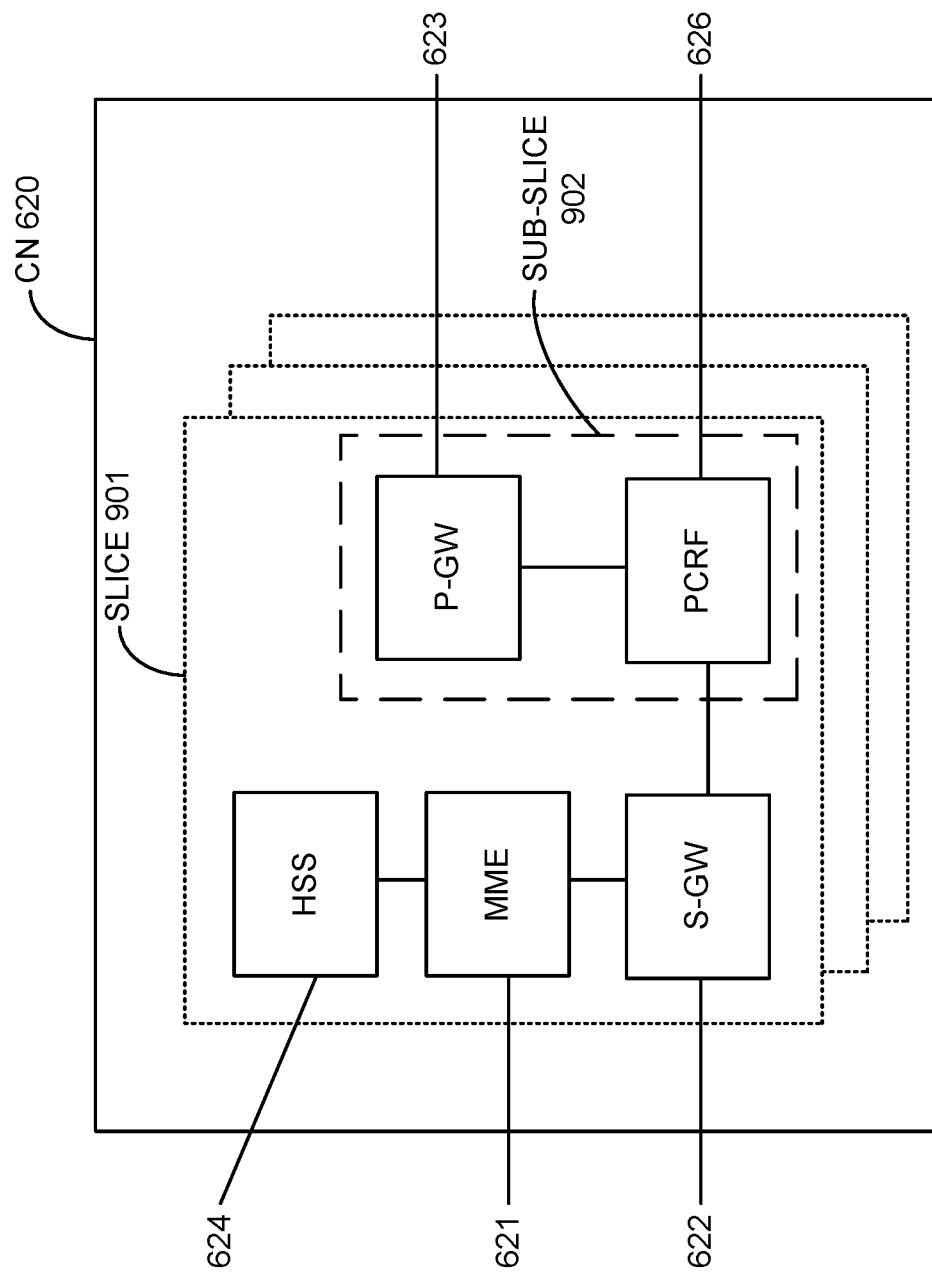
FIG. 9 illustrates components of a core network in accordance with some embodiments.

FIG. 9 illustrates components of a core network in accordance with some embodiments. The components of the CN 620 may be implemented in one physical node or separate physical nodes including components to read and execute instructions from a machine-readable or computer-readable medium (e.g., a non-transitory machine-readable storage medium). In some embodiments, Network Functions Virtualization (NFV) is utilized to virtualize any or all of the above described network node functions via executable instructions stored in one or more computer readable storage mediums (described in further detail below). A logical instantiation of the CN 620 may be referred to as a network slice 901. A logical instantiation of a portion of the CN 620 may be referred to as a network sub-slice 902 (e.g., the network sub-slice 902 is shown to include the PGW 623 and the PCRF 626).

NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Figure 10:
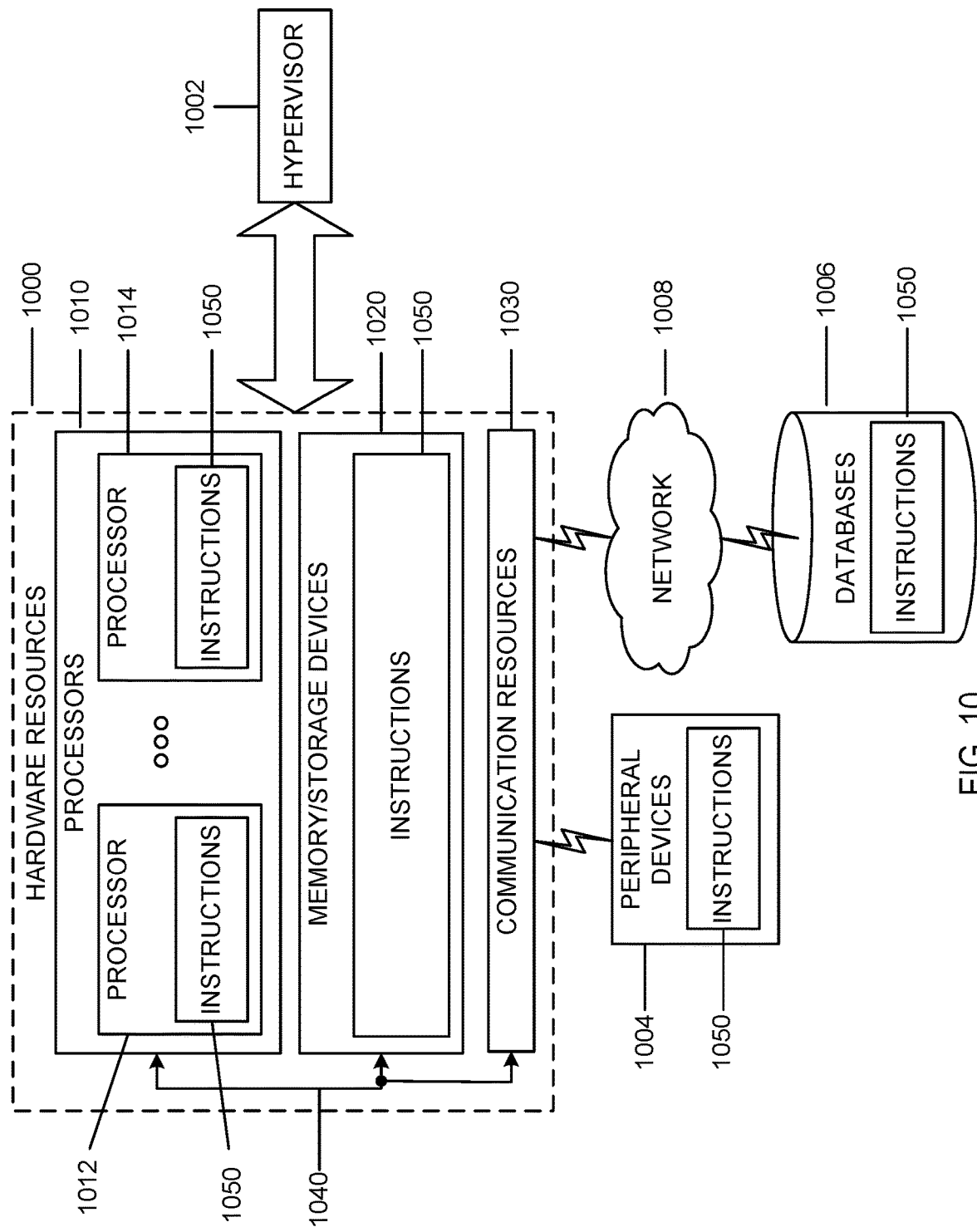
FIG. 10 is a block diagram illustrating components, according to some example embodiments, able to read instructions from a machine-readable or computer-readable and perform any one or more of the methodologies discussed herein.

FIG. 10 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 10 shows a diagrammatic representation of hardware resources 1000 including one or more processors (or processor cores) 1010, one or more memory/storage devices 1020, and one or more communication resources 1030, each of which may be communicatively coupled via a bus 1040. For embodiments where node virtualization (e.g., NFV) is utilized, a hypervisor 1002 may be executed to provide an execution environment for one or more network slices/sub-slices to utilize the hardware resources 1000.

The processors 1010 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1012 and a processor 1014.

The memory/storage devices 1020 may include main memory, disk storage, or any suitable combination thereof. The memory/storage devices 1020 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1030 may include interconnection or network interface components or other suitable devices to communicate with one or more peripheral devices 1004 or one or more databases 1006 via a network 1008. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1050 may comprise software, a program, an application, an applet, an app, or other executable code for causing at least any of the processors 1010 to perform any one or more of the methodologies discussed herein. The instructions 1050 may reside, completely or partially, within at least one of the processors 1010 (e.g., within the processor's cache memory), the memory/storage devices 1020, or any suitable combination thereof. Furthermore, any portion of the instructions 1050 may be transferred to the hardware resources 1000 from any combination of the peripheral devices 1004 or the databases 1006. Accordingly, the memory of processors 1010, the memory/storage devices 1020, the peripheral devices 1004, and the databases 1006 are examples of computer-readable and machine-readable media.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

Computer systems and the computers in a computer system may be connected via a network. Suitable networks for configuration and/or use as described herein include one or more local area networks, wide area networks, metropolitan area networks, and/or Internet or IP networks, such as the World Wide Web, a private Internet, a secure Internet, a value-added network, a virtual private network, an extranet, an intranet, or even stand-alone machines which communicate with other machines by physical transport of media. In particular, a suitable network may be formed from parts or entireties of two or more other networks, including networks using disparate hardware and network communication technologies.

One suitable network includes a server and one or more clients; other suitable networks may contain other combinations of servers, clients, and/or peer-to-peer nodes, and a given computer system may function both as a client and as a server. Each network includes at least two computers or computer systems, such as the server and/or clients. A computer system may include a workstation, laptop computer, disconnectable mobile computer, server, mainframe, cluster, so-called "network computer" or "thin client," tablet, smart phone, personal digital assistant or other hand-held computing device, "smart" consumer electronics device or appliance, medical device, or a combination thereof.

Suitable networks may include communications or networking software, such as the software available from Novell®, Microsoft®, and other vendors, and may operate using TCP/IP, SPX, IPX, and other protocols over twisted pair, coaxial, or optical fiber cables, telephone lines, radio waves, satellites, microwave relays, modulated AC power lines, physical media transfer, and/or other data transmission "wires" known to those of skill in the art. The network may encompass smaller networks and/or be connectable to other networks through a gateway or similar mechanism.

Various techniques, or certain aspects or portions thereof, may take the form of program code (i.e., instructions) embodied in tangible media, such as floppy diskettes, CD-ROMs, hard drives, magnetic or optical cards, solid-state memory devices, a nontransitory computer-readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and nonvolatile memory and/or storage elements), at least one input device, and at least one output device. The volatile and nonvolatile memory and/or storage elements may be a RAM, an EPROM, a flash drive, an optical drive, a magnetic hard drive, or other medium for storing electronic data. The eNB (or other base station) and UE (or other mobile station) may also include a transceiver component, a counter component, a processing component, and/or a clock component or timer component. One or more programs that may implement or utilize the various techniques described herein may use an application programming interface (API), reusable controls, and the like. Such programs may be implemented in a high-level procedural or an object-oriented programming language to communicate with a computer system. However, the program(s) may be implemented in assembly or machine language, if desired. In any case, the language may be a compiled or interpreted language, and combined with hardware implementations.

Each computer system includes one or more processors and/or memory; computer systems may also include various input devices and/or output devices. The processor may include a general purpose device, such as an Intel®, AMD®, or other "off-the-shelf" microprocessor. The processor may include a special purpose processing device, such as ASIC, SoC, SiP, FPGA, PAL, PLA, FPLA, PLD, or other customized or programmable device. The memory may include static RAM, dynamic RAM, flash memory, one or more flip-flops, ROM, CD-ROM, DVD, disk, tape, or magnetic, optical, or other computer storage medium. The input device(s) may include a keyboard, mouse, touch screen, light pen, tablet, microphone, sensor, or other hardware with accompanying firmware and/or software. The output device(s) may include a monitor or other display, printer, speech or text synthesizer, switch, signal line, or other hardware with accompanying firmware and/or software.

It should be understood that many of the functional units described in this specification may be implemented as one or more components, which is a term used to more particularly emphasize their implementation independence. For example, a component may be implemented as a hardware circuit comprising custom very large scale integration (VLSI) circuits or gate arrays, or off-the-shelf semiconductors such as logic chips, transistors, or other discrete components. A component may also be implemented in programmable hardware devices such as field programmable gate arrays, programmable array logic, programmable logic devices, or the like.

Components may also be implemented in software for execution by various types of processors. An identified component of executable code may, for instance, comprise one or more physical or logical blocks of computer instructions, which may, for instance, be organized as an object, a procedure, or a function. Nevertheless, the executables of an identified component need not be physically located together, but may comprise disparate instructions stored in different locations that, when joined logically together, comprise the component and achieve the stated purpose for the component.

Indeed, a component of executable code may be a single instruction, or many instructions, and may even be distributed over several different code segments, among different programs, and across several memory devices. Similarly, operational data may be identified and illustrated herein within components, and may be embodied in any suitable form and organized within any suitable type of data structure. The operational data may be collected as a single data set, or may be distributed over different locations including over different storage devices, and may exist, at least partially, merely as electronic signals on a system or network. The components may be passive or active, including agents operable to perform desired functions.

Several aspects of the embodiments described will be illustrated as software modules or components. As used herein, a software module or component may include any type of computer instruction or computer-executable code located within a memory device. A software module may, for instance, include one or more physical or logical blocks of computer instructions, which may be organized as a routine, program, object, component, data structure, etc., that perform one or more tasks or implement particular data types. It is appreciated that a software module may be implemented in hardware and/or firmware instead of or in addition to software. One or more of the functional modules described herein may be separated into sub-modules and/or combined into a single or smaller number of modules.

In certain embodiments, a particular software module may include disparate instructions stored in different locations of a memory device, different memory devices, or different computers, which together implement the described functionality of the module. Indeed, a module may include a single instruction or many instructions, and may be distributed over several different code segments, among different programs, and across several memory devices. Some embodiments may be practiced in a distributed computing environment where tasks are performed by a remote processing device linked through a communications network. In a distributed computing environment, software modules may be located in local and/or remote memory storage devices. In addition, data being tied or rendered together in a database record may be resident in the same memory device, or across several memory devices, and may be linked together in fields of a record in a database across a network.

Reference throughout this specification to "an example" means that a particular feature, structure, or characteristic described in connection with the example is included in at least one embodiment. Thus, appearances of the phrase "in an example" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on its presentation in a common group without indications to the contrary. In addition, various embodiments and examples may be referred to herein along with alternatives for the various components thereof. It is understood that such embodiments, examples, and alternatives are not to be construed as de facto equivalents of one another, but are to be considered as separate and autonomous representations.

Furthermore, the described features, structures, or characteristics may be combined in any suitable manner in one or more embodiments. In the following description, numerous specific details are provided, such as examples of materials, frequencies, sizes, lengths, widths, shapes, etc., to provide a thorough understanding of the embodiments. One skilled in the relevant art will recognize, however, that the embodiments may be practiced without one or more of the specific details, or with other methods, components, materials, etc. In other instances, well-known structures, materials, or operations are not shown or described in detail to avoid obscuring aspects of embodiments.

It should be recognized that the systems described herein include descriptions of specific embodiments. These embodiments can be combined into single systems, partially combined into other systems, split into multiple systems or divided or combined in other ways. In addition, it is contemplated that parameters/attributes/aspects/etc. of one embodiment can be used in another embodiment. The parameters/attributes/aspects/etc. are merely described in one or more embodiments for clarity, and it is recognized that the parameters/attributes/aspects/etc. can be combined with or substituted for parameters/attributes/etc. of another embodiment unless specifically disclaimed herein.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The following examples pertain to further embodiments.

Example 1 is an apparatus for an element manager (EM) of a mobile network that includes virtualized network functions. The apparatus includes one or more interfaces and a processor. The one or more interfaces to communicate with a network manager (NM) and a virtualized network function manager (VNFM). The processor to: process a suspend measurement job request received through the one or more interfaces from the NM, the suspend measurement job request to suspend a measurement job to provide network function (NF) performance measurements related to a virtualized resource (VR); in response to the suspend measurement job request, stop reporting measurement result data for the measurement job and determine whether to instruct the VNFM to delete one or more performance management (PM) jobs used to support the measurement job; and generate a suspend measurement job response to indicate to the NM a result of the suspend measurement job request to suspend the measurement job.

Example 2 is the apparatus of Example 1, wherein the processor is further to: in response to a determination to delete the one or more PM jobs, generate a delete PM job request to send to the VNFM to delete the one or more PM jobs; and process a delete PM job response, received from the VNFM, to determine that the one or more PM jobs have been deleted.

Example 3 is the apparatus of any of Examples 1-2, wherein the process is further to: process a resume measurement job request, received from the NM, to resume the measurement job to provide the NF performance measurements related to the VR; in response to the resume measurement job request, determine that the one or more PM jobs used to support the measurement job do not exist anymore, generate one or more PM job creation requests for the VNFM to create the one or more PM jobs to support the measurement job, and resume generation of reports of the measurement result data; and generate a resume measurement job response to indicate to the NM that the measurement job has been resumed.

Example 4 is the apparatus of Example 3, wherein at least one of the suspend measurement job request and the resume measurement job request comprises a job identifier (jobId) parameter corresponding to the measurement job.

Example 5 is the apparatus of Example 3, wherein the processor further responds to the resume measurement job request by: process one or more PM job creation responses from the VNFM to determine identifiers of the one or more PM jobs created by the VNFM to support the measurement job; and in response to the create PM job response, generate the resume measurement job response for the NM to indicate that the measurement job has been resumed.

Example 6 is the apparatus of Example 5, wherein at least one of the delete PM job request, the delete PM job response, and the create PM job response comprises one or more PM job identifier (pmJobId) parameters corresponding to the one or more PM jobs.

Example 7 is the apparatus of any of Examples 1-6, wherein the one or more PM jobs are for virtualized network function or virtualized network function component (VNF/VNFC) performance measurements related to the VR.

Example 8 is the apparatus of any of Examples 1-7, wherein the NM comprises network management functionality within an operation support system (OSS).

Example 9 is the apparatus of any of Examples 1-8, wherein the one or more interfaces comprise: a first interface to communicate with the NM; and a second interface to communicate with the VNFM.

Example 10 is the apparatus of Example 8, wherein the first interface comprises an Itf-N interface and the second interface comprises a Ve-Vnfm-em interface.

Example 11 is a machine readable storage medium including machine-readable instructions, when executed by one or more processors for an element manager (EM) of a mobile network that includes virtualized network functions, to: process a resume measurement job request, from a network manager (NM) of the virtualized network, to resume a suspended measurement job for network function performance measurements related to a virtualized resource (VR), the resume measurement job request comprising a job identifier (jobId) parameter corresponding to the suspended measurement job; determine a condition that one or more performance management (PM) jobs used to support the suspended measurement job do not exist; in response to the condition, generate one or more PM job creation requests for a virtualized network function manager (VNFM) to create the one or more PM jobs; and resume reporting of measurement result data corresponding to the jobId.

Example 12 is the machine readable storage medium of Example 11, wherein the machine-readable instructions are further to: process one or more PM job creation responses from the VNFM to indicate successful creation of the one or more PM jobs to support the suspended measurement job; and generate a resume measurement job response for the NM to indicate that the suspended measurement job has been resumed.

Example 13 is the machine readable storage medium of Example 12, wherein the one or more PM job creation responses comprise one or more PM job identifier (pmJobId) parameters corresponding to the one or more PM jobs.

Example 14 is the machine readable storage medium of any of Examples 11-13, wherein the NM comprises network management functionality within an operation support system (OSS).

Example 15 is the machine readable storage medium of any of Examples 11-14, wherein the one or more PM jobs are for virtualized network function or virtualized network function component (VNF/VNFC) performance measurements related to the VR.

Example 16 is an apparatus for a network manager (NM) in a mobile network that includes virtualized network functions. The apparatus includes an interface and a processor. The interface to send or receive, to or from a memory, a job identifier (jobId) parameter corresponding to a measurement job to collect network function (NF) performance measurements related to a virtualized resource (VR). The processor to: determine to suspend the measurement job to collect the NF performance measurements related to the VR; in response to the determination to suspend the measurement job, generate a first request to an element manager (EM) to suspend the measurement job, wherein the first request comprises the jobId parameter corresponding to the measurement job; process a first response from the EM comprising an indication of a result of the first request to suspend the measurement job; and determine, based on the first response from the EM, that the measurement job is a suspended measurement job.

Example 17 is the apparatus of Example 16, wherein the processor is further to: determine to resume the suspended measurement job to collect the NF performance measurements related to the VR; and in response to the determination to resume the suspended measurement job, generate a second request to the EM to resume the suspended measurement job.

Example 18 is the apparatus of Example 17, wherein the processor is further to process a second response from the EM to determine that the measurement job has been resumed.

Example 19 is the apparatus of any of Examples 17-18, wherein the second request comprises the jobId parameter.

Example 20 is the apparatus of any of Examples 16-19, wherein the NM comprises network management functionality within an operation support system (OSS).

Example 21 is a method for a network manager (NM) in a mobile network. The method include: determining to suspend a measurement job corresponding to a job identifier (jobId), the measurement job to collect network function (NF) performance measurements related to a virtualized resource (VR); sending a first request to an element manager (EM) to suspend the measurement job, wherein the first request comprises the jobId parameter corresponding to the measurement job; receiving a first response from the EM comprising an indication of a result of the first request to suspend the measurement job; and determining, based on the first response from the EM, that the measurement job is a suspended measurement job.

Example 22 is the method of Example 21, further comprising: determining to resume the suspended measurement job to collect the NF performance measurements related to the VR; and sending a second request to the EM to resume the suspended measurement job.

Example 23 is the method of Example 22, further comprising receiving a second response from the EM to determine that the measurement job has been resumed.

Example 24 is the method of Example 22, wherein the second request comprises the jobId parameter.

Example 25 is a method for an element manager (EM) of a mobile network that includes virtualized network functions. The method includes: processing a resume measurement job request, from a network manager (NM) of the virtualized network, to resume a suspended measurement job for network function performance measurements related to a virtualized resource (VR), the resume measurement job request comprising a job identifier (jobId) parameter corresponding to the suspended measurement job; determining a condition that one or more performance management (PM) jobs used to support the suspended measurement job do not exist; in response to the condition, generating one or more PM job creation requests for a virtualized network function manager (VNFM) to create the one or more PM jobs; and resuming reporting of measurement result data corresponding to the jobId.

Example 26 is the method of Example 25, further comprising: processing one or more PM job creation responses from the VNFM to indicate successful creation of the one or more PM jobs to support the suspended measurement job;

and generating a resume measurement job response for the NM to indicate that the suspended measurement job has been resumed.

Example 27 is the method of Example 26, wherein the one or more PM job creation responses comprise one or more PM job identifier (pmJobId) parameters corresponding to the one or more PM jobs.

Example 28 is an apparatus comprising means to perform a method as exemplified in any of Examples 21-27.

Example 29 is a machine-readable storage including machine-readable instructions, when executed, to implement a method or realize an apparatus as exemplified in any of Examples 21-27.

Example 30 is a machine readable medium including code, when executed, to cause a machine to perform the method of any one of Examples 21-27.

It will be understood by those having skill in the art that many changes may be made to the details of the above-described embodiments without departing from the underlying principles of the invention. The scope of the present invention should, therefore, be determined only by the following claims.

The invention claimed is:

1. An apparatus for an element manager (EM) of a mobile network that includes virtualized network functions, the apparatus comprising:
one or more interfaces to communicate with a network manager (NM) and a virtualized network function manager (VNFM); and
a processor to:
process a suspend measurement job request received through the one or more interfaces from the NM, the suspend measurement job request to suspend a measurement job to provide network function (NF) performance measurements related to a virtualized resource (VR);
in response to the suspend measurement job request, stop reporting measurement result data for the measurement job and determine whether to instruct the VNFM to delete one or more performance management (PM) jobs used to support the measurement job;
generate a suspend measurement job response to indicate to the NM a result of the suspend measurement job request to suspend the measurement job;
process a resume measurement job request, received from the NM, to resume the measurement job to provide the NF performance measurements related to the VR;
in response to the resume measurement job request, determine that the one or more PM jobs used to support the measurement job do not exist anymore, generate one or more PM job creation requests for the VNFM to create the one or more PM jobs to support the measurement job, and resume generation of reports of the measurement result data; and
generate a resume measurement job response to indicate to the NM that the measurement job has been resumed.

2. The apparatus of claim 1, wherein the processor is further to:
in response to a determination to delete the one or more PM jobs, generate a delete PM job request to send to the VNFM to delete the one or more PM jobs; and
process a delete PM job response, received from the VNFM, to determine that the one or more PM jobs have been deleted.

3. The apparatus of claim 1, wherein at least one of the suspend measurement job request and the resume measurement job request comprises a job identifier (jobId) parameter corresponding to the measurement job.

4. The apparatus of claim 1, wherein the processor further responds to the resume measurement job request by:
process one or more PM job creation responses from the VNFM to determine identifiers of the one or more PM jobs created by the VNFM to support the measurement job; and
in response to the create PM job response, generate the resume measurement job response for the NM to indicate that the measurement job has been resumed.

5. The apparatus of claim 4, wherein at least one of the delete PM job request, the delete PM job response, and the create PM job response comprises one or more PM job identifier (pmJobId) parameters corresponding to the one or more PM jobs.

6. The apparatus of claim 1, wherein the one or more PM jobs are for virtualized network function or virtualized network function component (VNF/VNFC) performance measurements related to the VR.

7. The apparatus of claim 1, wherein the NM comprises network management functionality within an operation support system (OSS).

8. The apparatus of claim 1, wherein the one or more interfaces comprise:
a first interface to communicate with the NM; and
a second interface to communicate with the VNFM.

9. The apparatus of claim 7, wherein the first interface comprises an Itf-N interface and the second interface comprises a Ve-Vnfm-em interface.

10. A machine readable storage medium including machine-readable instructions, when executed by one or more processors for an element manager (EM) of a mobile network that includes virtualized network functions, to:
process a resume measurement job request, from a network manager (NM) of the virtualized network, to resume a suspended measurement job for network function performance measurements related to a virtualized resource (VR), the resume measurement job request comprising a job identifier (jobId) parameter corresponding to the suspended measurement job;
determine a condition that one or more performance management (PM) jobs used to support the suspended measurement job do not exist;
in response to the condition, generate one or more PM job creation requests for a virtualized network function manager (VNFM) to create the one or more PM jobs; and
resume reporting of measurement result data corresponding to the jobId.

11. The machine readable storage medium of claim 10, wherein the machine-readable instructions are further to:
process one or more PM job creation responses from the VNFM to indicate successful creation of the one or more PM jobs to support the suspended measurement job; and
generate a resume measurement job response for the NM to indicate that the suspended measurement job has been resumed.

12. The machine readable storage medium of claim 11, wherein the one or more PM job creation responses comprise one or more PM job identifier (pmJobId) parameters corresponding to the one or more PM jobs.

13. The machine readable storage medium of claim 10, wherein the NM comprises network management functionality within an operation support system (OSS).

14. The machine readable storage medium of claim 10, wherein the one or more PM jobs are for virtualized network function or virtualized network function component (VNF/VNFC) performance measurements related to the VR.

15. A method for an element manager (EM) of a mobile network that includes virtualized network functions, the method comprising:
   processing a resume measurement job request, from a network manager (NM) of the virtualized network, to resume a suspended measurement job for network function performance measurements related to a virtualized resource (VR), the resume measurement job request comprising a job identifier (jobId) parameter corresponding to the suspended measurement job;
   determining a condition that one or more performance management (PM) jobs used to support the suspended measurement job do not exist;
   in response to the condition, generating one or more PM job creation requests for a virtualized network function manager (VNFM) to create the one or more PM jobs; and
   resuming reporting of measurement result data corresponding to the jobId.

16. The method of claim 15, further comprising:
   processing one or more PM job creation responses from the VNFM to indicate successful creation of the one or more PM jobs to support the suspended measurement job; and
   generating a resume measurement job response for the NM to indicate that the suspended measurement job has been resumed.

17. The method of claim 16, wherein the one or more PM job creation responses comprise one or more PM job identifier (pmJobId) parameters corresponding to the one or more PM jobs.

18. The method of claim 15, wherein the NM comprises network management functionality within an operation support system (OSS).

19. The method of claim 15, wherein the one or more PM jobs are for virtualized network function or virtualized network function component (VNF/VNFC) performance measurements related to the VR.

\* \* \* \* \*